(12) United States Patent
Farooq et al.

(10) Patent No.: US 11,945,391 B1
(45) Date of Patent: Apr. 2, 2024

(54) VEHICLE AIRBAG SYSTEM

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/066,414

(22) Filed: Dec. 15, 2022

(51) Int. Cl.
*B60R 21/213* (2011.01)
*B60J 7/00* (2006.01)

(52) U.S. Cl.
CPC .......... *B60R 21/213* (2013.01); *B60J 7/0007* (2013.01)

(58) Field of Classification Search
CPC .............................. B60R 21/213; B60J 7/0007
See application file for complete search history.

(56) References Cited

U.S. PATENT DOCUMENTS

| | | | | |
|---|---|---|---|---|
| 2,346,554 A * | 4/1944 | Clark | ....................... | B60J 5/067 296/100.12 |
| 2,559,471 A * | 7/1951 | Schrock | ................. | B60J 3/0204 296/97.11 |
| 3,894,750 A * | 7/1975 | Eckels | .................... | B60R 21/33 222/5 |
| 5,145,231 A * | 9/1992 | Gotomyo | ................. | B60J 7/047 296/220.01 |
| 5,186,231 A * | 2/1993 | Lewis | ................. | E04F 10/0607 160/264 |
| 5,259,659 A * | 11/1993 | Inaba | ....................... | B60J 5/067 280/143 |
| 5,660,414 A * | 8/1997 | Karlow | .................... | B60R 21/08 180/274 |
| 6,102,436 A | 8/2000 | Bayley et al. | | |
| 6,116,644 A * | 9/2000 | Viano | .................... | B60R 21/232 280/743.1 |
| 6,231,072 B1 | 5/2001 | Pywell et al. | | |
| 6,460,919 B2 | 10/2002 | Bienert et al. | | |
| 6,902,188 B2 * | 6/2005 | Nakamura | ............ | B60R 21/213 280/730.2 |
| 8,162,376 B1 * | 4/2012 | Grossmith | ............ | B60J 3/0243 296/97.4 |
| 8,251,440 B2 | 8/2012 | Zarewych et al. | | |
| 8,967,661 B2 * | 3/2015 | Mueller | ................ | B60R 21/214 280/730.2 |
| 9,988,008 B2 * | 6/2018 | Thieberger | ............. | G06F 3/011 |
| 10,239,390 B1 * | 3/2019 | Wolf | .......................... | B60J 7/02 |
| 10,399,527 B2 * | 9/2019 | Schütt | ..................... | B60R 21/08 |
| 10,486,502 B2 * | 11/2019 | Westfall | ................. | B60J 1/2088 |
| 10,717,406 B2 * | 7/2020 | Thieberger | .......... | B60R 21/0134 |
| 10,814,705 B2 * | 10/2020 | Donkin | ..................... | B60J 7/041 |
| 11,332,061 B2 * | 5/2022 | Thieberger | ............... | B60J 5/047 |

(Continued)

*Primary Examiner* — Jason D Shanske
*Assistant Examiner* — Joselynn Y Sliteris
(74) *Attorney, Agent, or Firm* — Frank A. MacKenzie; Bejin Bieneman PLC (57) ABSTRACT

A vehicle includes a vehicle body including a roof and a pillar. The vehicle includes a track supported by the roof and elongated along a cross-vehicle axis. The vehicle includes a headliner slideable along the track from a stowed position to a deployed position. The headliner in the stowed position extends along the roof and in the deployed position extends along the pillar.

20 Claims, 6 Drawing Sheets

(56) References Cited

U.S. PATENT DOCUMENTS

| | | | |
|---|---|---|---|
| 11,358,556 B2* | 6/2022 | Min | B60R 21/214 |
| 11,472,273 B1* | 10/2022 | Singer | B62D 33/0207 |
| 2003/0197354 A1 | 10/2003 | Beland et al. | |
| 2009/0174217 A1* | 7/2009 | Lawall | B60J 1/2041 |
| | | | 296/97.11 |

* cited by examiner

VEHICLE AIRBAG SYSTEM

BACKGROUND

Vehicles impact be subject to impact tests to test the movement of vehicle occupants. Such tests may be standardized by various governmental or industry organizations. Some test, for example, measure the movement of vehicle occupants during certain vehicle impacts that move the vehicle occupants in cross-vehicle directions. A side airbag is typically utilized to control kinematics of an occupant in the cross-vehicle direction. The airbag is typically mounted to a seatback or a roof rail and is inflatable along a side of an occupant, specifically along a head and/or torso of the occupant. The side airbag, for example, may be inflatable between the occupant and a vehicle door. The side airbag controls the kinematics of the occupant in certain vehicle impacts that urge the occupant in a cross-vehicle direction, e.g., a side impact.

DETAILED DESCRIPTION

A vehicle includes a vehicle body including a roof and a pillar. The vehicle includes a track supported by the roof and elongated along a cross-vehicle axis. The vehicle includes a headliner slideable along the track from a stowed position to a deployed position. the headliner in the stowed position extends along the roof and in the deployed position extending along the pillar.

The vehicle may include a retractor supported by the vehicle body and operatively coupled to the headliner to move the headliner from the stowed position to the deployed position.

The retractor may be pyrotechnically activated.

The vehicle may include a second track elongated along a vehicle-vertical axis and supported by the pillar, and a shuttle slidable along the second track, the retractor operatively coupled to the headliner via the shuttle.

The vehicle may include one or more tethers connected to the shuttle and the headliner.

The vehicle may include a second tether connected to the shuttle and the retractor.

The headliner in the deployed position may extend to a bottom edge, the bottom edge below a beltline of the vehicle body.

The vehicle body may include a side window and the headliner in the deployed position may extend across the side window.

The headliner may include a main portion and an extension portion, the main portion of the headliner in the stowed position may be generally planar and the extension portion of the headliner in the stowed position may be folded.

The extension portion of the headliner in the deployed position may be generally planar and extend along the pillar of the vehicle.

The headliner in the stowed position may extend outboard from a centerline of the vehicle body along the cross-vehicle axis.

The headliner may include an inflation chamber inflatable to an inflated position.

The vehicle may include an inflator operatively coupled to the headliner to provide inflation medium to the inflation chamber.

The vehicle may include a computer having a processor and a memory storing instructions to move the headliner to the deployed position and to inflate the inflation chamber to the inflated position in response to detecting an impact to the vehicle.

The inflator may be supported by the pillar.

The vehicle may include a second headliner supported by the roof and movable from a second stowed position to a second deployed position, the second headliner in the stowed position extending along the roof and in the second deployed position extending along a second side of the vehicle.

The second headliner may be slideable along the track from the second stowed position to the second deployed position.

The headliner in the stowed position may extend outboard from a centerline of the vehicle body along the cross-vehicle axis and the second headliner in the second stowed position may extend from the centerline of the vehicle body away from the headliner in the stowed position along the cross-vehicle axis.

The vehicle body may define a passenger cabin, and the headliner may include a class-A surface facing the passenger cabin.

With reference to the Figures, wherein like numerals indicate like parts throughout the several views, a vehicle 20 having a vehicle body 22 with a roof 24 and a pillar 46 is shown. The vehicle 20 includes a track 26 supported by the roof 24 and elongated along a cross-vehicle axis A1. The vehicle 20 includes one or more headliners 28 slideable along the track 26 from a stowed position to a deployed position. The headliner 28 in the stowed position extends along the roof 24 and in the deployed position extends along the pillar 46. The headliner 28 may control kinematics of an occupant of the vehicle 20, e.g., after a certain vehicle impact is detected by an impact sensor 34 and the headliner 28 commanded to the deployed position by a computer 36 of the vehicle 20.

The vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 may include the vehicle body 22. The vehicle body 22 includes body panels partially defining an exterior of the vehicle 20. The body panels may present a class-A surface, e.g., a finished surface exposed to view by a customer and free of unaesthetic blemishes and defects. The vehicle body 22 defines a passenger compartment 38 to house occupants, if any, of the vehicle 20. The passenger compartment 38 may extend across the vehicle 20, i.e., from one side to the other side of the vehicle 20. The passenger compartment 38 includes a front end and a rear end with the front end being in front of the rear end during forward movement of the vehicle 20.

The roof 24 extends across a top of the passenger compartment 38, e.g., protecting occupants and components in the passenger compartment 38 from rain, dirt, sun, etc. The roof 24 may include cross beams 40 elongated along the cross-vehicle axis A1, e.g., from a right side 30 of the vehicle body 22 to an opposite left side 32 of the vehicle body 22. The roof 24 may include a roof body panel 42. The roof body panel 42 may present an exterior class-A surface. The roof body panel 42 may be supported by the cross beams 40. The roof 24 may include an internal panel 44. The internal panel 44 may be supported by the cross beams 40 opposite the roof body panel 42.

The vehicle body 22 may include pillars 46. For example, the vehicle body 22 may include various configurations of vertical body-mounted pillars 46 on each side of the vehicle 20. The A-pillars 46 may extend between a windshield and front doors for the vehicle 20. In other words, the A-pillars 46 may be disposed at the front end of the passenger compartment 38. Various vertical body-mounted pillars 46 may be used in different configurations rearward of the A-pillar 46 depending on the vehicle architecture.

The vehicle 20 includes one or more side windows 48, e.g., at the right side 30 and the left side 32 of the vehicle 20. The side windows 48 include a transparent material, e.g., tempered glass, supported in an opening defined by the vehicle body 22. The side windows 48 may be arranged along the side of the vehicle 20, e.g., one side window 48 between any two of the vertical body-mounted pillars 46, etc. The side windows 48 may be supported by doors of the vehicle body 22. The side windows 48 may be retractable, e.g., to open the respective side window 48.

One or more tracks 26 are included in the vehicle 20 to control movement of the headliner 28 between the stowed position and the deployed position. For example, the tracks 26 may permit movement of the headliner 28 along the cross-vehicle axis A1 and inhibit movement of the headliner 28 along a vehicle-longitudinal axis A2. The tracks 26 may include channels, rails, or any other suitable structure. For example, the tracks 26 may include strut channels, C-channels, or the like and having inward facing lips. The tracks 26 are elongated along the cross-vehicle axis A1. In other words, the tracks 26 are longer along the cross-vehicle axis A1 than along the vehicle-longitudinal axis A2 and a vehicle-vertical axis A3. The tracks 26 are supported by the roof 24, e.g., under the internal panel 44 relative to the vehicle-vertical axis A3. The tracks 26 may be fixed to the roof 24, e.g., to the internal panel 44 or the cross beams 40. The tracks 26 may be plastic or any suitable material. The assembly may include a plurality of tracks 26, e.g., spaced from each other along the vehicle-longitudinal axis A2.

The headliners 28 may include, e.g., a rigid panel, a padding such as foam, and a covering such as fabric. The headliners 28 may include a class-A surface facing the passenger cabin. The one or more headliners 28 are supported by the roof 24, e.g., by the tracks 26 fixed to the roof 24. Each headliner 28 is slidable along the tracks 26 from its respective stowed position to its respective deployed position. For example, headliner shuttles 50 may be fixed to the headliners 28 and operatively engaged with the tracks 26 to slide there along.

Figure 1:
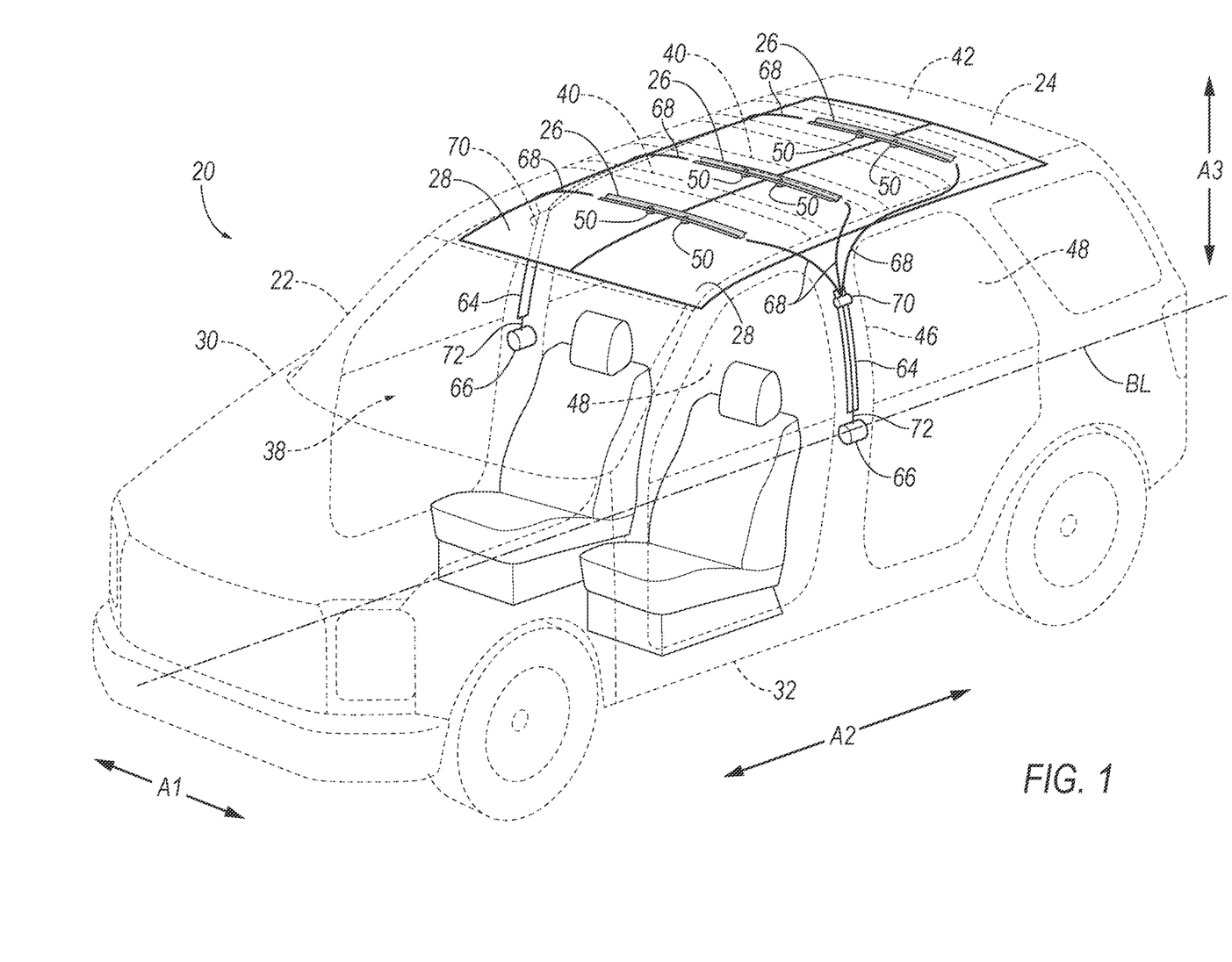
FIG. 1 is a perspective view of a vehicle with deployable headliners at stowed positions.
Figure 2:
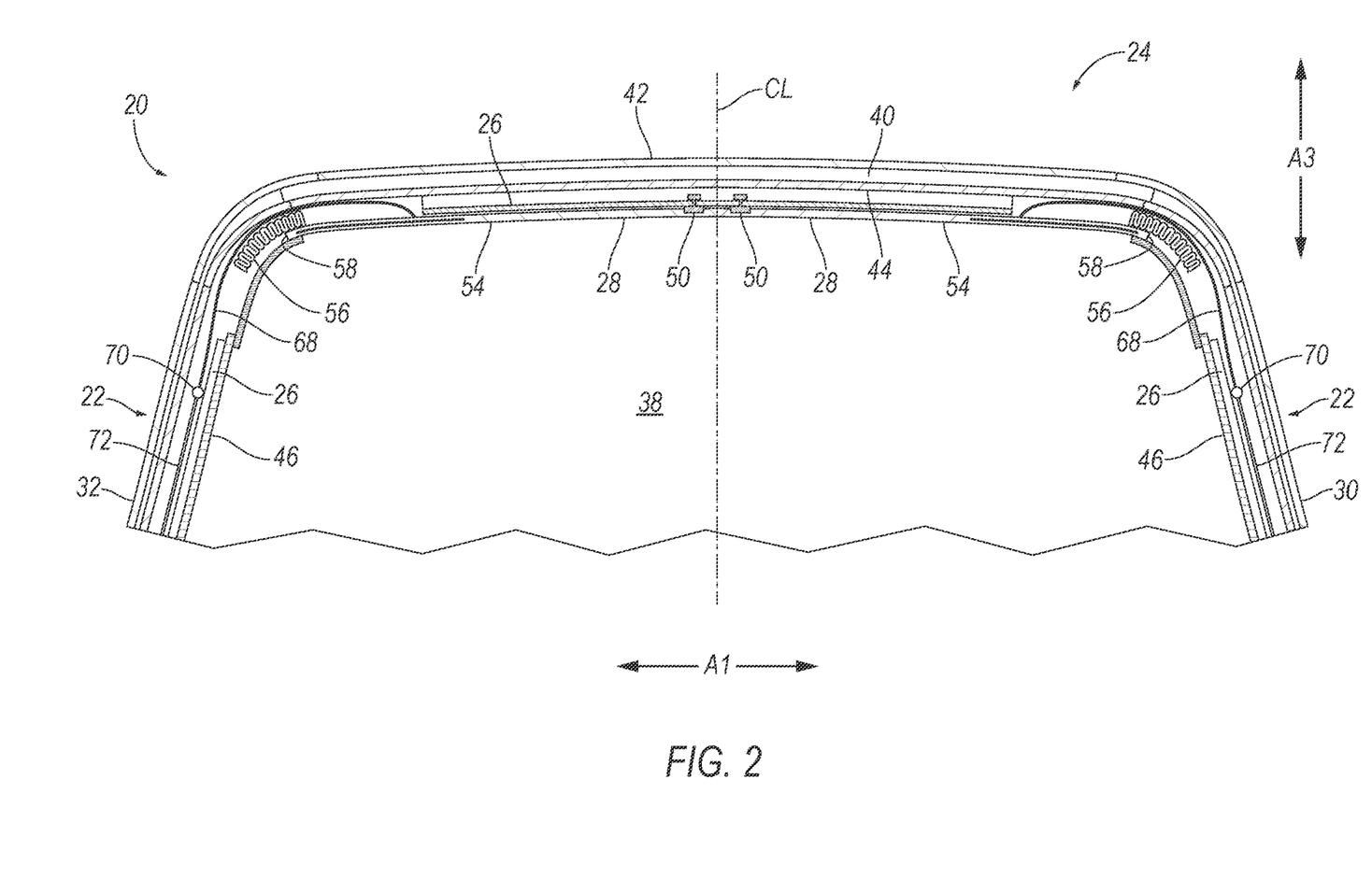
FIG. 2 is a front cross-section view of a portion of the vehicle that includes a roof.
Figure 3:
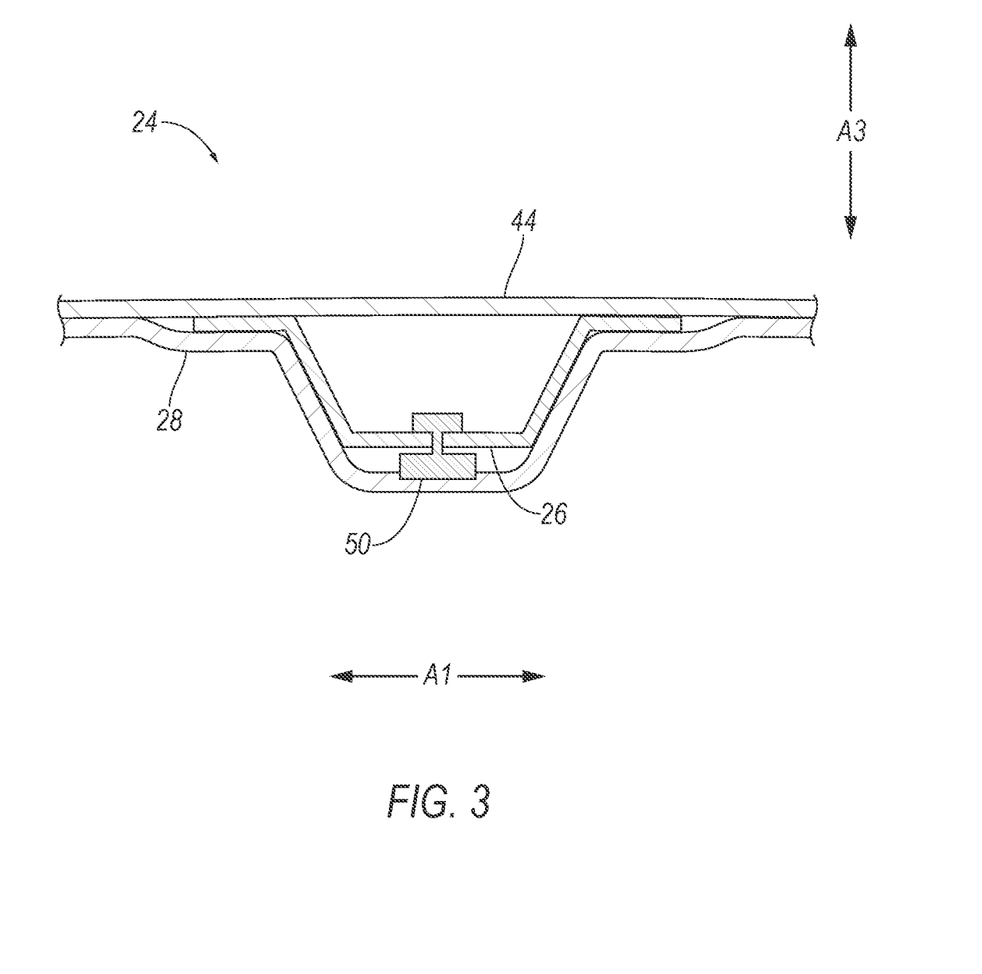
FIG. 3 is a side cross-section view of a track supporting the deployable headliner.

With reference to FIGS. 1 and 2, the headliners 28 in the stowed positions are shown. The headliners 28 in the stowed positions extend along the roof 24 in the passenger compartment 38, e.g., one at the right side 30 and one at the left side 32. The headliners 28 in the stowed positions extend outboard from a centerline CL of the vehicle body along the cross-vehicle axis A1. The headliners 28 in the stowed positions may extend away from the center line and away from each other. For example, one headliner 28 may extend from the centerline CL toward the right side 30 and the other headliner 28 may extend from the center line toward the left side 32.

Figure 4:
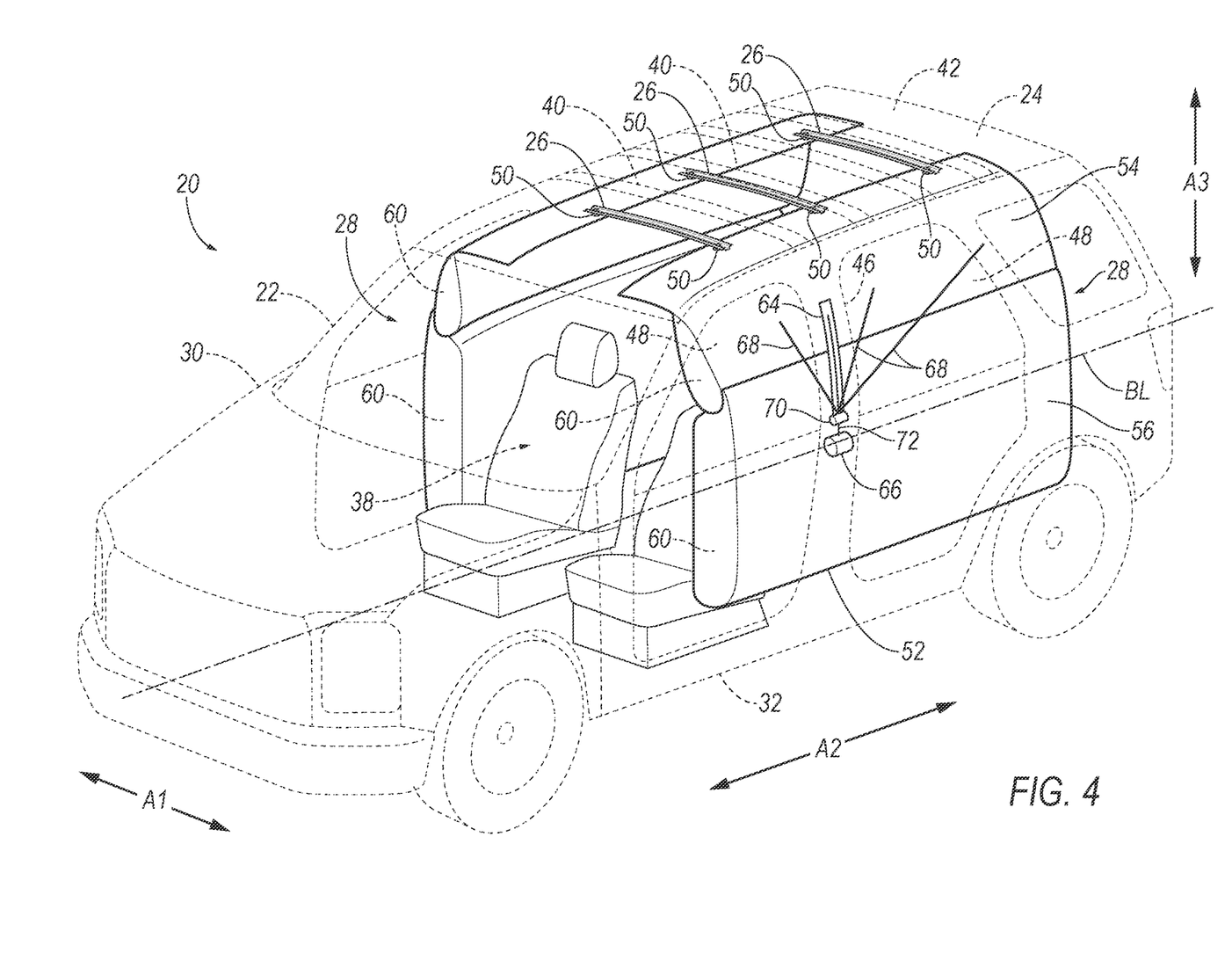
FIG. 4 is a perspective view of the vehicle with the deployable headliners at deployed positions.
Figure 5:
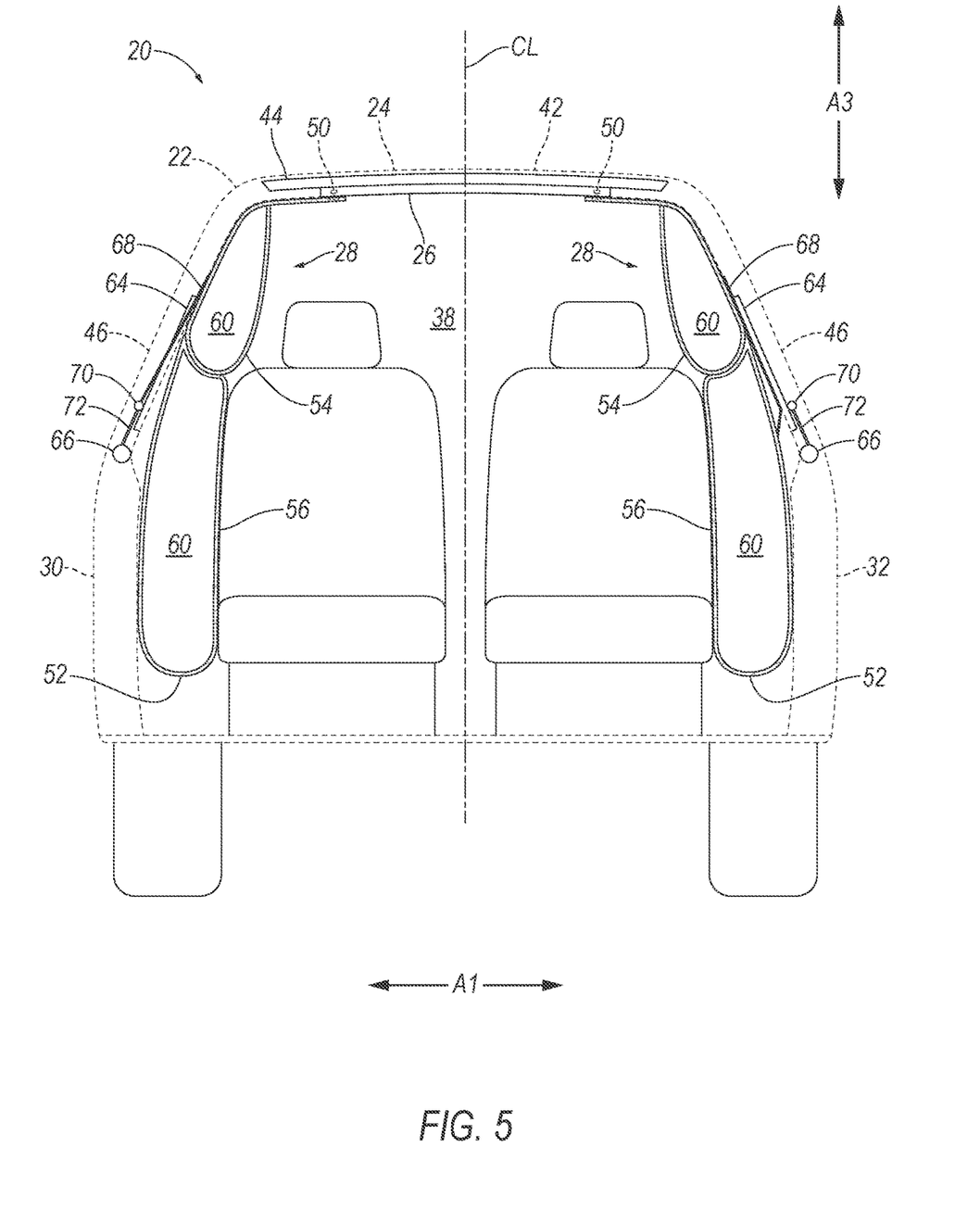
FIG. 5 is a front cross-section view of the vehicle with the deployable headliners at the deployed positions.

With reference to FIGS. 4 and 5, the headliners 28 in the deployed positions are shown. The headliners 28 in the deployed positions extend along the pillars 46, e.g., at the sides 30, 32 of the vehicle 20. For example, one headliner 28 in its deployed position may extend along the pillar 46 at the right side 30 of the vehicle 20 and the other headliner 28 in its deployed position may extend along the pillar 46 at the left side 32 of the vehicle 20. The headliners 28 in the deployed positions may extend across the side window 48. For example, the headliners 28 in the deployed positions may cover the windows, e.g., separating an occupant of the vehicle 20 from the side windows 48. The headliners 28 in the deployed positions extend to respective bottom edges 52. The bottom edges 52 may be elongated along the vehicle-longitudinal axis A2. The bottom edges 52 of the headliners 28 in the deployed positions may be below a beltline BL of the vehicle body that extends along bottoms of the side windows 48. In other words, the bottom edges 52 of the headliners 28 in the deployed positions may be between the bottoms of the windows 48 and the floor of the vehicle body 22 along the vehicle-vertical axis A3.

Each headliner 28 may include a main portion 54 and an extension portion 56. The extension portion 56 may extend from an outboard edge 58 of the main portion 54. The main portion 54 may have a higher rigidity that the extension portion 56. The main portion 54 of the headliner 28 in the stowed position is generally planar, i.e., not folded. The extension portion 56 of the headliner 28 in the stowed position may be folded, e.g., between the main portion 54 of the headliner 28 and the internal panel 44 of the roof 24 or under a trim panel at a roof rail that extends along the vehicle-longitudinal axis A2 at the respective right side 30 or left side 32 of the vehicle 20. The extension portions 56 of the headliners 28 in the deployed positions are generally planar, e.g., extending along the vehicle-longitudinal axis A2 and the vehicle-vertical axis A3. The extension portions 56 of the headliners 28 in the deployed positions extends along the sides 30, 32 of the vehicle 20, e.g., downward from the outboard edges 58 of the main portions 54.

Each headliner 28 may include an inflation chamber 60 inflatable to an inflated position, e.g., as shown in FIG. 5. The inflation chamber 60 may be, for example, between a pair of fabric panels. The inflation chamber 60 can have any suitable shape. For example, the inflation chamber 60 can include narrowed passages, uninflatable portions, or the like. The inflation chamber 60 can be at the main portion 54 and/or the extension portion 56 of the headliner 28.

The assembly may include inflators 61 operatively coupled to the headliners 28 to provide inflation medium to the inflation chambers 60, e.g., in response to a command from the computer 36. The inflator 61 may be, for example, a pyrotechnic inflator 61 that uses a chemical reaction to drive inflation medium to the inflation chamber 60. The inflator 61 may be of any suitable type, for example, a cold-gas inflator 61. The inflators 61 may be supported by the pillars 46. The inflators 61 may be fixed to pillars 46, e.g., fixed to the respective vertical body-mounted pillar 46 and under a trim panel.

The assembly may include one or more second tracks 64, e.g., one second track 26 at the right side 30 of the vehicle 20 and another second track 26 at the left side 32 of the vehicle 20. The second tracks 64 maybe elongated along the vehicle-vertical axis A3. In other words, the second tracks 64 may be longer along the vehicle-vertical axis A3 than along the vehicle-longitudinal axis A2 and the cross-vehicle axis A1. The second tracks 64 may include channels, rails, or any other suitable structure. The second tracks 64 may be supported by the vehicle body 22, e.g., by the pillars 46. The second tracks 64 may be fixed to pillars 46, e.g., fixed to the respective vertical body-mounted pillar 46 and under the trim panel.

The assembly may include one or more retractors 66 that are operatively coupled to the headliners 28 to move the headliners 28 from the stowed position to the deployed position, e.g., one retractor 66 at the right side 30 of the vehicle 20 and another retractor 66 at the left side 32 of the vehicle 20. The retractors 66 actuate, e.g., in response to receiving a command from the computer 36 of the vehicle 20. The retractors 66 may be supported by, e.g., the pillars 46 of the vehicle body 22. The retractors 66 may be fixed to pillars 46, e.g., fixed to the respective vertical body-mounted pillar 46 and under a trim panel.

The retractors 66 may be operatively coupled to the headliners 28 via first tethers 68, shuttles 70, second tethers 72, and/or any other suitable structure. The first tethers 68 are connected to the shuttles 70 and the headliner 28. For example, one end of the first tethers 68 may be fixed to extension portion 56 of the headliner 28, e.g., via stitching, adhesive, fastener, or the like. An opposite end of the first tethers 68 may be fixed to the shuttle 70. The shuttles 70 are slidable along the second tracks 64, e.g., one shuttle 70 slidable along the second track 26 at the right side 30 of the vehicle 20 and another shuttle 70 slidable along the second track 26 at the left side 32 of the vehicle 20. The shuttles 70 are operatively engaged with the second tracks 64 such that the shuttles 70 are permitted to move along the second tracks 64, e.g., along the vehicle-vertical axis A3, and inhibited from moving transverse to second tracks 64, e.g., along the vehicle-longitudinal axis A2 and the cross-vehicle axis A1. The second tethers 72 are connected to the shuttles 70 and the retractors 66. For example, one end of the second tethers 72 may be fixed to the respective shuttle 70 at the right side 30 or the left side 32, and an opposite end may be attached to the respective retractor 66 at the right side 30 or the left side 32.

Each retractor 66 may be actuatable to retract the second tether 72 connected thereto, e.g., in response to a command received from the computer 36. The retractor 66 may be, for example, a rotary actuator that winds the second tether 72 around a spool or a linear actuator that urges the second tether 72 is a certain direction. The retractor 66 may be pyrotechnically activated, i.e., include pyrotechnic material that is combusted to actuate the retractor 66. The pyrotechnic material may be combustible to produce gas. The pyrotechnic material may be formed of a solid mixture of substances that, when ignited, react to produce the gas. For example, the pyrotechnic material may be formed of sodium azide (NaNO3), potassium nitrate (KNO3), and silicon dioxide (SiO2), which react to form nitrogen gas (N2). In examples where the pyrotechnic retractors are rotary, the pyrotechnic material may rotate the spool connected to the second tether 72 such that the second tether 72 winds around the shaft. In other examples, the retractor 66 may be a piston linkage, in which the pyrotechnic material for example, drives a piston attached to the second tether 72; a ball-in-tube linkage, in which a pyrotechnic material propels a ball or balls over a cogwheel connected to the second tether 72; or any other suitable type.

Figure 6:
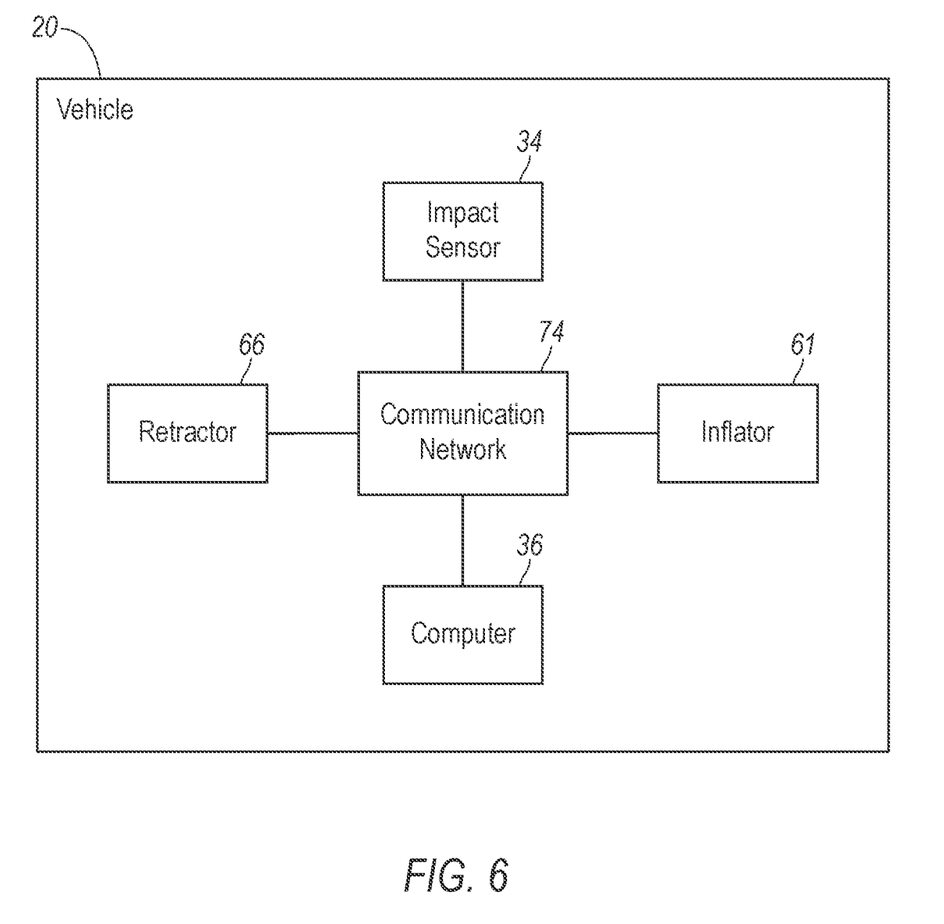
FIG. 6 is a block diagram of components of the vehicle.

The vehicle 20 may include at least one impact sensor 34 for sensing certain impacts of the vehicle 20, and the computer 36 in communication with the impact sensor 34 and the inflators 61. The computer 36 may activate the inflators 61, e.g., provide an impulse to a pyrotechnic charge of the inflators 61 when the impact sensor 34 senses an impact of the vehicle 20. Alternatively or additionally to sensing impact, the impact sensor 34 may be configured to sense impact prior to impact, i.e., pre impact sensing. The impact sensor 34 may be in communication with the computer 36. The impact sensor 34 is configured to detect an impact to the vehicle 20. The impact sensor 34 may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 34 may be located at numerous points in or on the vehicle 20.

The computer 36 includes a processor and a memory that stores instructions executable by the processor. The memory includes one or more forms of computer 36 readable media, and stores instructions executable by the computer 36 for performing various operations, including as disclosed herein. For example, the computer 36 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 36 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 36. The memory can be of any type, e.g., hard disk drives, solid state drives, servers, or any volatile or non-volatile media. The memory can store the collected data sent from the sensors. The computer 36 may include or be communicatively coupled to, e.g., via a communication network 74 such as a communications bus as described further below, more than one processor, e.g., included in components such as sensors, electronic control units (ECUs) or the like included in the vehicle 20 for monitoring and/or controlling various vehicle components, e.g., a powertrain controller, a brake controller, a steering controller, etc. The computer 36 is generally arranged for communications on the communication network 74 that can include a bus in the vehicle 20 such as a controller area network CAN or the like, and/or other wired and/or wireless mechanisms. Alternatively or additionally, in cases where the computer 36 actually comprises a plurality of devices, the communication network 74 may be used for communications between devices represented as the computer 36 in this disclosure. Further, as mentioned below, various controllers and/or sensors may provide data to the computer 36 via the communication network 74.

During normal operation of the vehicle 20, the headliners 28 are at the stowed positions. The computer 36 is programmed to, i.e., the memory stores instructions executable by the processor to, in response to detecting certain impacts to the vehicle 20, actuate the retractor 66 to move the headliners 28 from the stowed positions to the deployed position and actuate the inflator 61 to inflate the inflation chamber 60 to the inflated position. For example, the computer 36 may detect certain impacts to vehicle 20 by receiving information from the impact sensor 34 that indicates the impact to the vehicle 20. The computer 36 may receive such information via the communication network 74. In response to receiving the information indicating the impact, the computer 36 may command actuation of the retractors 66, e.g., by transmitting an electrical pulse to the retractors 66 that causes actuation of the pyrotechnic material. In response to receiving the information indicating the impact, the computer 36 may command actuation of the inflators 61, e.g., by transmitting an electrical pulse to the inflators 61. The electrical pulses may be transmitted, e.g., via the communication network 74. The computer 36 may actuate the inflators 61 after actuation of the retractors 66. In other words, the computer 36 may inflate the inflation chambers 60 after moving the headliners 28 to the deployed positions.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
    a vehicle body including a roof and a pillar, the vehicle body defining a passenger cabin;
    a track supported by the roof and elongated along a cross-vehicle axis; and
    a headliner slideable along the track from a stowed position to a deployed position, the headliner in the stowed position and in the deployed position includes a class-A surface facing the passenger cabin, the headliner in the stowed position extending along the roof and in the deployed position extending along the pillar.

2. The vehicle of claim 1, further comprising a retractor supported by the vehicle body and operatively coupled to the headliner to move the headliner from the stowed position to the deployed position.

3. The vehicle of claim 2, wherein the retractor is pyrotechnically activated.

4. The vehicle of claim 2, further comprising a second track elongated along a vehicle-vertical axis and supported by the pillar, and a shuttle slidable along the second track, the retractor operatively coupled to the headliner via the shuttle.

5. The vehicle of claim 4, further comprising one or more tethers connected to the shuttle and the headliner.

6. The vehicle of claim 1, wherein the headliner in the deployed position extends to a bottom edge, the bottom edge below a beltline of the vehicle body.

7. The vehicle of claim 1, wherein the vehicle body includes a side window and the headliner in the deployed position extends across the side window.

8. The vehicle of claim 1, wherein the headliner includes a main portion and an extension portion, the main portion of the headliner in the stowed position is generally planar and the extension portion of the headliner in the stowed position is folded.

9. The vehicle of claim 8, wherein the extension portion of the headliner in the deployed position is generally planar and extends along the pillar of the vehicle.

10. The vehicle of claim 1, wherein the headliner in the stowed position extends outboard from a centerline of the vehicle body along the cross-vehicle axis.

11. The vehicle of claim 1, wherein the headliner includes an inflation chamber inflatable to an inflated position.

12. The vehicle of claim 11, further comprising an inflator operatively coupled to the headliner to provide inflation medium to the inflation chamber.

13. The vehicle of claim 11, further comprising a computer having a processor and a memory storing instructions to move the headliner to the deployed position and to inflate the inflation chamber to the inflated position in response to detecting an impact to the vehicle.

14. The vehicle of claim 12, wherein the inflator is supported by the pillar.

15. The vehicle of claim 1, further comprising a second headliner supported by the roof and movable from a second stowed position to a second deployed position, the second headliner in the second stowed position extending along the roof and in the second deployed position extending along a side of the vehicle.

16. The vehicle of claim 15, wherein the second headliner is slideable along the track from the second stowed position to the second deployed position.

17. The vehicle of claim 15, wherein the headliner in the stowed position extends outboard from a centerline of the vehicle body along the cross-vehicle axis and the second headliner in the second stowed position extends from the centerline of the vehicle body away from the headliner in the stowed position along the cross-vehicle axis.

18. A vehicle, comprising: a vehicle body including a-roof and a pillar;
- a track supported by the roof and elongated along a cross-vehicle axis; and
- a headliner that includes a main portion and an extension portion, the headliner slideable along the track from a stowed position to a deployed position, the headliner in the stowed position extending along the roof with the main portion of the headliner in the stowed position being generally planar, and the headliner in the deployed position extending along the pillar with the extension portion of the headliner in the stowed position being folded.

19. The vehicle of claim 18, wherein the extension portion of the headliner in the deployed position is generally planar and extends along the pillar of the vehicle.

20. A vehicle, comprising:
- a vehicle body including a roof and a pillar;
- a track supported by the roof and elongated along a cross-vehicle axis;
- a headliner slideable along the track from a stowed position to a deployed position, the headliner in the stowed position extending along the roof and in the deployed position extending along the pillar;
- a second track elongated along a vehicle-vertical axis and supported by the pillar;
- a shuttle slidable along the second track;
- a retractor supported by the vehicle body and operatively coupled to the headliner to move the headliner from the stowed position to the deployed position, the retractor operatively coupled to the headliner via the shuttle;
- one or more tethers connected to the shuttle and the headliner; and
- a second tether connected to the shuttle and the retractor.

\* \* \* \* \*

UNITED STATES PATENT AND TRADEMARK OFFICE
CERTIFICATE OF CORRECTION

PATENT NO. : 11,945,391 B1
APPLICATION NO. : 18/066414
DATED : April 2, 2024
INVENTOR(S) : S. M. Iskander Farooq et al.

It is certified that error appears in the above-identified patent and that said Letters Patent is hereby corrected as shown below:

In the Claims

Claim 18, Column 9, Line 11　　　delete the "-" after --a--.

Signed and Sealed this
Seventh Day of May, 2024

*Katherine Kelly Vidal*

Katherine Kelly Vidal
*Director of the United States Patent and Trademark Office*